United States Patent [19]

Deuring

[11] Patent Number: 4,548,547
[45] Date of Patent: Oct. 22, 1985

[54] SEAL ASSEMBLY, PARTICULARLY FOR LIQUID PUMPS

[75] Inventor: Hans Deuring, Burscheid, Fed. Rep. of Germany

[73] Assignee: Goetze AG, Burscheid, Fed. Rep. of Germany

[21] Appl. No.: 563,747

[22] Filed: Dec. 21, 1983

[30] Foreign Application Priority Data

Dec. 24, 1982 [DE] Fed. Rep. of Germany ....... 3248074

[51] Int. Cl.$^4$ ..................... F04D 29/12; F16J 15/36
[52] U.S. Cl. .................. 415/170 A; 415/171; 415/173 R; 415/174; 277/38; 277/88
[58] Field of Search ............. 415/170 A, 171, 172 R, 415/173 R, 173 A, 174; 416/174; 277/38, 39, 40, 41, 42, 44, 88, 89

[56] References Cited

U.S. PATENT DOCUMENTS

| | | | |
|---|---|---|---|
| 2,379,868 | 7/1945 | Curtis | 415/170 A |
| 2,851,289 | 9/1958 | Pedersen | 415/170 A |
| 3,024,048 | 3/1962 | Kobert | 277/12 |
| 3,068,801 | 12/1962 | Murray | 415/170 A |
| 3,127,184 | 3/1964 | Talamonti | 277/88 |
| 3,131,956 | 5/1964 | Bailey | 416/174 |
| 3,168,869 | 2/1965 | Sieghartner | 415/170 A |
| 3,278,191 | 10/1966 | Gits et al. | 277/40 |
| 3,354,529 | 11/1967 | James | 415/170 A |
| 3,366,068 | 1/1968 | Rye | 415/173 A |
| 3,542,496 | 11/1970 | Bergeson et al. | 415/170 A |
| 3,594,102 | 7/1971 | Oden | 415/170 A |
| 4,205,857 | 6/1980 | Menager | 277/38 |

FOREIGN PATENT DOCUMENTS

| | | |
|---|---|---|
| 1453716 | 1/1969 | Fed. Rep. of Germany . |
| 2623583 | 12/1977 | Fed. Rep. of Germany . |
| 2729928 | 1/1980 | Fed. Rep. of Germany . |
| 2181111 | 11/1973 | France . |
| 2182272 | 12/1973 | France . |
| 2324913 | 4/1977 | France . |
| 0784928 | 10/1957 | United Kingdom .......... 415/170 A |

OTHER PUBLICATIONS

"Machine Design" magazine, Sep. 13, 1973 issue, pp. 1-6.

Primary Examiner—Robert E. Garrett
Assistant Examiner—H. Edward Li
Attorney, Agent, or Firm—Spencer & Frank

[57] ABSTRACT

A seal assembly for a rotary machine comprises a rotary machine part of a hard rubber-like elastomer and a sheet metal hub surrounded by the rotary machine part and being permanently bonded thereto. The sheet metal hub is generally sleeve-shaped and has a radial base situated within the rotary machine part and a generally cylindrical wall extending substantially along the entire axial length of the rotary machine part in a coaxial relationship therewith. The seal assembly further has a counter ring in contact with the rotary machine part and a slide ring seal unit being in sliding contact with the counter ring.

5 Claims, 3 Drawing Figures

SEAL ASSEMBLY, PARTICULARLY FOR LIQUID PUMPS

BACKGROUND OF THE INVENTION

This invention relates to a seal assembly for a rotary machine part, particularly a pump impeller for a liquid pump. The assembly includes the pump impeller mounted on a pump shaft by means of an impeller hub, a counter ring cooperating with the impeller, a slide ring seal as well as a connecting body axially holding together components of the seal assembly.

German Pat. No. 2,729,928 discloses a centrifugal pump including an integrated seal unit. An impeller made of steel or fiber-reinforced synthetic material is affixed to a hub made of a thick-walled sintered steel or metal. A counter ring is arranged on the free end of the hub with the interposition of an elastomer member. A connecting body extends axially from the free end of the hub beyond the far end of the slide ring seal. The connecting body is made of metal or is formed from the elastomer counter ring. It is a disadvantage of this known construction that the relatively compact impeller-and-hub connection has a relatively large weight and thus represents an appreciable manufacturing expense. It is a further disadvantage of this known structure that it is not possible to integrate the counter ring-which often is made of brittle material, such as ceramics—in the impeller to thus obtain an axially shorter structural unit. Further, in the known structure an additional connecting body—made of an elastomer or metal—is (and necessarily has to be) provided for connecting either the impeller or the hub with the slide ring seal as a structural unit.

German Offenlegungsschrift (application published without examination) No. 2,623,583 discloses a centrifugal pump, particularly a cooling water pump for automotive vehicles. In this structure, the slide ring seal, the impeller and the counter ring are combined to a structural unit in such a manner that the slide ring seal has a housing which surrounds the counter ring and the counter ring is fixedly connected with the impeller with the intermediary of an elastomer body. The metal impeller, again, is not adapted to receive, directly or with the intermediary of an elastomer layer, the counter ring made of a brittle material. Further, again, a separate connecting part is needed to obtain a unit for installation.

U.S. Pat. No. 3,594,102 discloses a water pump impeller having electrically insulating and anti-corrosion properties. The impeller which is of a synthetic material is, in the zone of its inner circumferential surface, provided with an axially relatively short metal support body and is, by means of a headless screw, fixed radially to the pump shaft. The impeller has an axial extension also made of a synthetic material. A counter ring is positioned in a recess of the impeller by means of an elastic body. If the elastic body were absent and the counter ring were made, for example, of a ceramic material, the non-yielding synthetic material of the impeller could not prevent a heat-caused bursting of the brittle counter ring.

SUMMARY OF THE INVENTION

It is an object of the invention to provide an improved seal assembly of the above-outlined type which, with as few components as possible, constitutes a relatively lightweight and compact installable unit in which, for reducing the axial structural length, a brittle counter ring may be received by the rotary machine part (impeller) and protected thereby even under extreme operational conditions.

This object and others to become apparent as the specification progresses, are accomplished by the invention, according to which, briefly stated, there is provided a rotary machine part, such as a pump impeller made of a hard rubber-like elastomer material and a sheet metal hub which extends substantially along the entire axial length of the rotary machine part and is permanently connected (for example, by vulcanization or glueing) therewith and, in the installed state, entirely surrounds the shaft end.

By virtue of the combination of the two different types of material for the rotary machine part (impeller) and its hub, there is provided a relatively lightweight and inexpensive connection as compared to the prior art. The weight reduction according to the invention also results in a higher efficiency of the pump. A further improvement is achieved by the fact that by selecting the impeller material there may be made an impeller with an optimal efficiency determined by the arcuate and undercut impeller blades as well as a smooth impeller surface. Such a construction has been possible heretofore only in case of metallic impellers manufactured with a "lost core" casting method which represented relatively high costs.

The elastomer material of the impeller should have a sufficient hardness to make it mechanically resistant even in extreme operating conditions, while, at the same time, it should be sufficiently elastic for receiving a counter ring, made of a brittle material, such as ceramics, without the need of interposing an additional elastomer material. For this purpose, the counter ring is pressed into an opening of the impeller axially facing the slide ring seal; the walls defining the opening have, at least along a length portion, a circumferentially extending wavy configuration. By virtue of the wavy configuration an elasticity is achieved which is necessary to compensate for manufacturing tolerances and to prevent a bursting of the counter ring as a result of a thermal shock. Thus, the brittle counter ring is capable of displacing the residually elastic material of the impeller in a radial direction in case of a temperature-caused expansion and thus can adapt itself to different environmental conditions during operation.

The measure according to the invention ensures that defective counter rings may be replaced by the manufacturer of the seal assemblies without the need of discarding the entire impeller. Such a disadvantage, however, is inherent in an impeller disclosed in German Offenlegungsschrift (application published without examination) No. 1,453,716. The impeller disclosed therein is made in part of rubber and has reinforcing elements as well as a counter ring formed thereon. Because of the elasticity of the rubber, the impeller, contrary to the impeller according to the invention, needs reinforcing elements to ensure the required stability. All components are vulcanized or glued to one another so that no replacement of damaged components is possible. In contradistinction, the impeller according to the invention is entirely of a hard rubber-like elastomer material with residually elastic properties, while the counter ring is pressed or inserted into an opening of the impeller and is immobilized therein.

According to a further feature of the invention, the hub extends axially underneath the counter ring and the hub zone which cooperates with the counter ring is preferably provided with at least one rib forcing the elastomer material of the impeller radially in the direction of the counter ring. By virtue of this feature, the counter ring, despite random tolerance fluctuations, is held securely in the opening of the impeller and further, during vulcanizing, a rubber overrun in the direction of the slide ring seal is prevented. Preferably, the rib is of circumferential course in order to generate a uniform force distribution on the entire annular circumference. It is to be noted that other rib contours may be feasible dependent upon the material of the counter ring.

According to a further feature of the invention, the hub is extended, as a one-piece member, axially beyond the impeller in the direction of the slide ring seal. Dependent upon the design of the slide ring seal which may be connected with the impeller by means of a separate connecting body, the axial extension of the hub serves as a guiding body for the entire slide ring seal or parts thereof.

According to a further feature of the invention, the hub is axially extended to such an extent that it serves as the connecting body between the impeller and the slide ring seal. In contradistinction to the arrangement disclosed in the earlier-mentioned German Pat. No. 2,729,928, two additional components can be dispensed with because the hub functions directly as the connecting member and carries the counter ring without the intermediary of an additional elastomer body. For this purpose, the free end of the hub may be bent radially along its entire surface or only partially—for example, as resilient tabs—in the direction of the slide ring seal. It is added that dependent upon the design of the slide ring seal to be coupled with the impeller, the axial leg of the hub may have other shapes in the zone of the slide ring seal. By virtue of these measures, there is formed, from few components, a relatively lightweight seal assembly which may be installed as a one-piece structural assembly into the machine component it is intended to serve. It is a further feature of the invention to design the earlier-mentioned rib such that during vulcanizing, elastomer material may flow axially along the hub to its end zone where it hardens to form a bead which may serve for axially immobilizing the slide ring seal as a snap-in connection.

DESCRIPTION OF THE PREFERRED EMBODIMENTS

Figures 1, 2, 3:
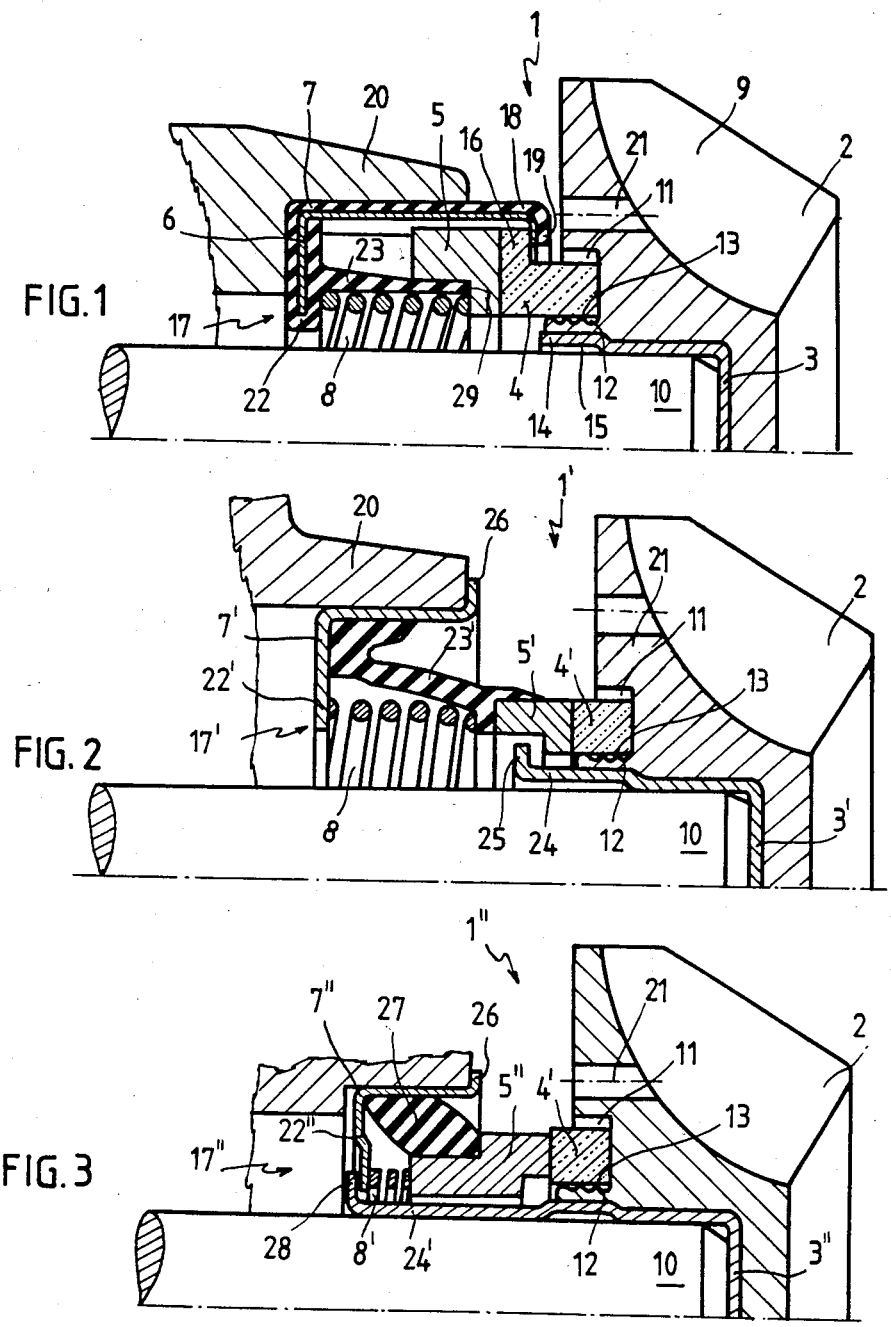
FIG. 1 is an axial sectional view of a preferred embodiment of the invention.
FIG. 2 is an axial sectional view of another preferred embodiment of the invention.
FIG. 3 is an axial sectional view of still another preferred embodiment of the invention.

Turning to FIG. 1, there is shown a seal assembly generally designated at 1 which essentially comprises an impeller 2, a hub 3, a counter ring 4, a slide ring 5, an elastomer slide ring seal housing 7 having a reinforcement 6, as well as a spring 8 urging the slide ring 5 against the counter ring 4. According to the invention, the impeller 2 is of a hard rubber-like elastomer body having radially outwardly oriented impeller vanes 9. It is immaterial for the invention whether the vane structure 9 is oriented towards the slide ring side or, as shown, towards the end face of a pump (not shown). A generally sleeve-like drawn sheet metal hub 3 having a radial base and a generally cylindrical wall is bonded (vulcanized) to the impeller 2. In the installed state the hub 3 completely surrounds the end of the pump shaft 10 and extends substantially throughout the entire axial length of the impeller 2. The counter ring 4 is made of a ceramic material, for example, sintered or pressed $Al_2O_3$ or burnt $SiO_2$ and is received in an annular recess 11 provided in a radial end face of the impeller 2. The cooperating circumferential wall surface 12 of the impeller 2 bounding the recess 11 has a wavy configuration 13 by means of which a residual elasticity of the relatively hard impeller 2 is enhanced in order to better prevent a bursting of the brittle counter ring 4 in case conditions of thermal shock exist. The hub end 14 which extends axially underneath the counter ring 4 is provided with a circumferential enlargement 15 projecting radially in the direction of the counter ring 4. The enlargement 15 presses the wall 12 radially outwardly relative to the impeller axis to thus ensure that the counter ring 4 is firmly held in the opening 11 of the impeller 2 even in case of tolerance differences. The counter ring 4 is provided with a preferably angularly extending radial collar 16. The housing 7 of the slide ring seal unit generally designated at 17 is, as described in the earlier-mentioned German Offenlegungsschrift No. 2,623,583, axially extended at 18 and reaches, with a bent radial leg 19, axially behind the collar 16 of the counter ring 4. By means of a special tool, as described, for example, in German Pat. No. 2,729,928, the seal assembly 1 may be pressed into the pump housing 20. For this purpose axially extending recesses 21 are provided in the impeller 2. The elastomer housing 7 of the slide ring seal unit 17 is reinforced by an angled stiffening ring 6. On the radial leg 22 of the housing 7 there is formed a diaphragm 23 on which the slide ring 5 is axially inserted. The spring 8 extends axially between the radial leg 22 of the housing 7 and a radial annular end face 29 of the slide ring 5.

Turning now to the embodiment illustrated in FIG. 2, the seal assembly 1' shown therein is similar to the FIG. 1 embodiment with the difference that the connection between the impeller 2 and the slide ring seal unit 17' is effected by an axial prolongation 24 of the hub 3'. The free end 25 of the hub 3' is, in the zone of the stepped-down slide ring 5', bent radially outwardly. The counter ring 4' has the configuration of an axially short cylinder. The slide ring seal unit 17', while similar to the structure shown in FIG. 1, has, however, a metal housing 7' bent angularly and having a radial extension 26 which serves as an abutment against an annular face of the pump housing 20 effective when the slide ring seal unit 17' is pressed into the pump housing 20. The housing 7', the diaphragm 23' and the slide ring 5' are vulcanized to one another to form a one-piece component. The spring 8 extends between the radial leg 22' of the housing 7' and the end of the diaphragm 23' which partially surrounds the slide ring 5'.

Turning now to FIG. 3, there is illustrated a seal assembly 1" which differs from the previously described structures essentially in that the hub 3" of the impeller 2 is axially extended at 24' such that the extension serves as a connecting body between the impeller 2 and the slide ring seal unit 17" until it reaches axially behind the slide ring seal unit 17" and is radially outwardly bent at 28 at that location. The slide ring seal 17" itself comprises an angularly shaped housing 7"

with a radial abutment 26 situated axially opposite recesses 21 in the impeller 2, a slide ring 5", a spring 8' with a rectangular cross-sectional configuration as well as a spring seal ring (hose slice) 27 extending essentially conically between the housing 7" and the slide ring 5". The radial leg 22" of the housing 7" is, in the zone of its free end, slightly axially bent in the direction of the slide ring 5" in order to ensure that in the installed state of the seal assembly 1" no friction can be generated between the radial leg 22" and the radially bent end 28 of the extended hub 3".

It will be understood that the above description of the present invention is susceptible to various modifications, changes and adaptations, and the same are intended to be comprehended within the meaning and range of equivalents of the appended claims.

What is claimed is:

1. A seal assembly for a rotary machine comprising:
   (a) a rotary machine part of a hard rubber-like elastomer having a rotary axis, an axial length and a generally radial end;
   (b) an annular recess in said generally radial end of said rotary machine part; said annular recess being defined by radially inner and radially outer concentric annular axial wall portions of said rotary machine part; said radially inner wall portion having a wavy configuration;
   (c) a sheet metal hub surrounded by said rotary machine part and being permanently bonded thereto; said sheet metal hub being generally sleeve-shaped having a radial base situated within said rotary machine part and a generally cylindrical wall coaxial with said rotary axis and extending substantially along the entire axial length of said rotary machine part; said hub having a rib; said radially inner wall portion surrounding said hub and being in circumferential contact with said hub, including said rib;
   (d) a counter ring being directly received in said annular recess and being generally coaxial with said rotary machine part; said counter ring being in circumferential frictional engagement with said wavy configuration of said radially inner wall portion and surrounding circumferentially a length portion of said hub; said counter ring having a brittle material relative to said rotary machine part; wherein diametral dimensions of said hub, including said rib, and diametral dimensions of said radially inner wall portion being selected such that said rib deforms said radially inner wall portion towards said counter ring; and
   (e) a slide ring seal unit being in sliding contact with said counter ring and being generally coaxial with said rotary machine part.

2. A seal assembly as defined in claim 1, wherein said rotary machine is a liquid pump including a pump shaft having an end and said rotary machine component is an impeller of said pump; said impeller, said counter ring and said slide ring seal unit being mountable on said shaft; said hub entirely surrounding said end of said shaft in a mounted state of said impeller.

3. A seal assembly as defined in claim 1, wherein said generally cylindrical wall of said hub projects axially beyond said radial end of said rotary machine part towards said slide ring seal unit.

4. A seal assembly as defined in claim 3, wherein said generally cylindrical wall of said hub projects axially through and beyond said slide ring seal unit and has a radially outwardly bent terminus engaging behind said slide ring seal unit for connecting said slide ring seal unit to said rotary machine part.

5. A seal assembly as defined in claim 1, wherein said rib extends circumferentially on said hub.

* * * * *